United States Patent
Barnes et al.

(10) Patent No.: US 10,363,877 B2
(45) Date of Patent: Jul. 30, 2019

(54) LOAD SPACE COVERING DEVICE

(71) Applicant: Jaguar Land Rover Limited, Whitley, Coventry, Warwickshire (GB)

(72) Inventors: Corrina Barnes, Gaydon (GB); Brian Lidgard, Banbury (GB); Nicholas Pang, Leamington Spa (GB); Mark Butler, Coventry (GB); Sam Henshaw, Leamington Spa (GB); Derron Smith, Southa (GB); Andrew Loughead, Birmingham (GB); Christopher Todd, Banbury (GB); Steven Smith, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 91 days.

(21) Appl. No.: 15/317,901

(22) PCT Filed: Jun. 10, 2015

(86) PCT No.: PCT/EP2015/062980
§ 371 (c)(1),
(2) Date: Dec. 9, 2016

(87) PCT Pub. No.: WO2015/189294
PCT Pub. Date: Dec. 17, 2015

(65) Prior Publication Data
US 2017/0113621 A1    Apr. 27, 2017

(30) Foreign Application Priority Data
Jun. 10, 2014   (GB) .................................. 1410241.2

(51) Int. Cl.
*B60R 5/04*       (2006.01)
*E06B 9/68*       (2006.01)
*B60R 21/08*      (2006.01)

(52) U.S. Cl.
CPC .............. *B60R 5/047* (2013.01); *B60R 21/08* (2013.01); *E06B 9/68* (2013.01); *E06B 2009/689* (2013.01); *E06B 2009/6836* (2013.01)

(58) Field of Classification Search
CPC ......... B60R 5/045; B60R 5/047; B60R 5/048; E06B 9/68
(Continued)

(56) References Cited

U.S. PATENT DOCUMENTS 6,843,518 B2 * 1/2005 Schlecht .............. B60N 2/3011
                                                         280/749
6,930,592 B2    8/2005 Schlecht et al.
(Continued)

FOREIGN PATENT DOCUMENTS

DE    102005014798 A1    10/2006
DE    102005055625 A1     5/2007
(Continued)

OTHER PUBLICATIONS

English translation of FR 2893881; retreived on Apr. 16, 2018 via PatentTranslate located at www.epo.org. (Year: 2018).*
(Continued)

*Primary Examiner* — Jason S Daniels
(74) *Attorney, Agent, or Firm* — Reising Ethington P.C.

(57) ABSTRACT

A device, kit, and method that utilize a cover for covering a load space of a vehicle. The cover is movable between a retracted position in which the load space is uncovered and a deployed position in which the load space is at least partially covered. A detector is used for detecting an object in the path of the cover, such that damage to the object or cover may be avoided during deployment of the cover.

18 Claims, 11 Drawing Sheets

(58) Field of Classification Search
USPC .......................... 296/37.16, 136.03, 136.04
See application file for complete search history.

(56) References Cited

U.S. PATENT DOCUMENTS

| | | | |
|---|---|---|---|
| 7,963,580 B2 | 6/2011 | Plettrichs et al. | |
| 8,162,370 B2* | 4/2012 | Hintennach | B60R 5/047 296/37.16 |
| 8,844,995 B2* | 9/2014 | Nagao | B60R 5/044 296/24.4 |
| 9,061,633 B2 | 6/2015 | Nagao et al. | |
| 2004/0035631 A1 | 2/2004 | Schlecht et al. | |

FOREIGN PATENT DOCUMENTS

| | | |
|---|---|---|
| DE | 102010021206 A1 | 11/2011 |
| EP | 1375254 A1 | 1/2004 |
| FR | 2893881 A1 | 6/2007 |
| WO | WO2012132366 A1 | 10/2012 |

OTHER PUBLICATIONS

Combined Search and Examination Report for application No. GB1410241.2, dated Dec. 18, 2014, 6 pages.
International Search Report for International application No. PCT/EP2015/062980, dated Oct. 2, 2015, 6 pages.
Written Opinion for International application No. PCT/EP2015/062980, dated Oct. 2, 2015, 5 pages.
combined Search and Examination Report for application No. GB1510105.8, dated Feb. 11, 2016, 7 pages.

\* cited by examiner

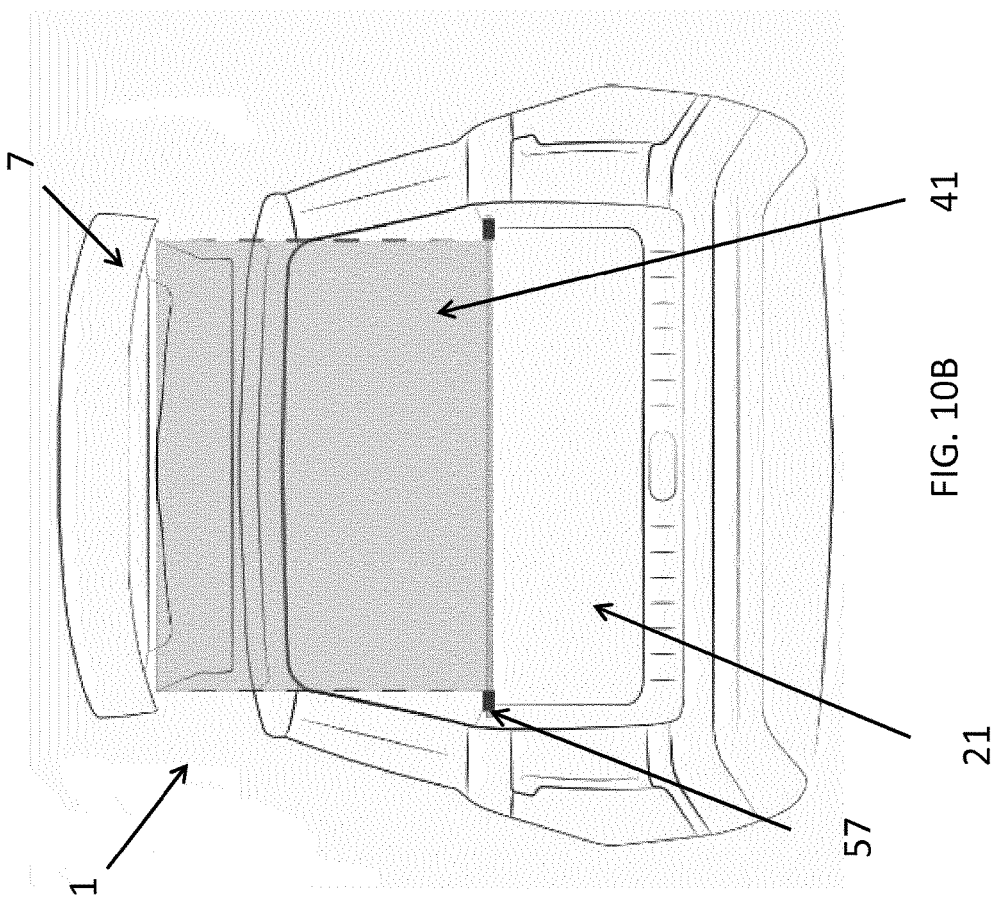
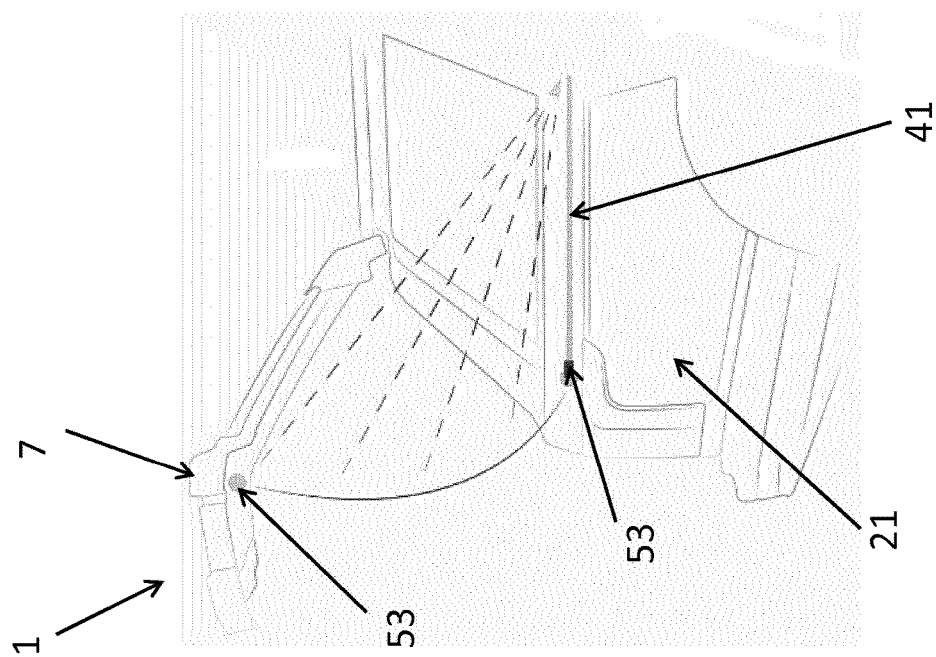
FIG. 10A
FIG. 10B

LOAD SPACE COVERING DEVICE

TECHNICAL FIELD

The present disclosure relates to a load space covering device; to a vehicle incorporating a load space covering device; to a kit of parts for a vehicle load space cover and to a method of covering a load space of a vehicle.

BACKGROUND

It is known to provide a retractable cover for covering the load space of the boot of a motor vehicle. These types of covers are provided for hiding items such as luggage disposed in the load space of the vehicle, and also for improving the aesthetics of the inside of the vehicle. The cover is usually housed in a cassette which is mounted behind the rear seats of the vehicle. The cover can be selectively deployed from the cassette and secured at the rear of the vehicle to cover the load space. However, when the cover deploys, the cover can run into for example an item disposed in the load space, as it is not adapted to stop itself before encountering the item. Therefore, in such an arrangement, the cover or the item that the cover has encountered can be damaged during the deployment of the cover. Furthermore, when the cover is in a stowed configuration (i.e. an undeployed state) it is difficult to manually reach the cover from the outside of the vehicle. Also, the cassette and cover may occasionally be removed from its operative position, but the weight and length of the cassette can make it difficult to stow elsewhere inside or outside the vehicle.

At least in certain embodiments, the present invention sets out to overcome or ameliorate at least some of the problems associated with known load space covering device.

SUMMARY

Aspects of the present invention relate to a load space covering device; to a vehicle incorporating a load space covering device; to a kit of parts for a vehicle load space cover and to a method of covering a load space of a vehicle.

According to a further aspect of the present invention there is provided a device for covering a load space of a vehicle, the device comprising a cover which is movable between a retracted position in which the load space is uncovered and a deployed position in which the load space is at least partially covered wherein the device comprises means for detecting an object in the path of the cover. In use, when the cover deploys and when an object is disposed on the path of the cover, the detecting means can detect the object. Thus, damaging of the cover or of the item can be avoided. Also, the need to reconfigure the device to accommodate different vehicle configurations can be avoided. In use, if the vehicle seating is reconfigured, at least in certain embodiments the device can still function without modifying the control strategy. By way of example, if an occasional seat is deployed in the load space, the detecting means can detect the presence of the seat and control deployment of the cover accordingly.

The detecting means may comprise at least one sensor disposed on the cover. The at least one sensor may be disposed on a free edge of the cover. The at least one sensor may be disposed in a detection strip extending at least partially along the free edge of the cover. The at least one sensor can be chosen from the group comprising mechanical switches, electrical contacts, capacitive sensors, optical sensors and sonic sensors.

A pull bar can be provided at a free edge of the cover and said at least one sensor can be disposed in said pull bar. The pull bar can comprise fixing means for releasably fixing the pull bar to coupling means disposed on the vehicle. The fixing means are for example in the form of a locking pin or locking recess provided at each end of the pull bar.

The detecting means may comprise at least one sensor operable to output a signal indicative of a seat of the vehicle being disposed within the path of the cover. The signal may be indicative of at least one of: a vehicle seat being in a folded/stowed state; a row position of the seat within the vehicle; a position of the seat within the vehicle with respect to a longitudinal axis of the vehicle; and, a position of a headrest of the seat with respect to a backrest of the seat. Advantageously, the deployed position of the cover may be determined in dependence on the seat position signal.

The device can be configured for mounting to a closure element of the vehicle. When the closure element is opened, the device can travel with the closure element. Thus, access to the load space is not obstructed by the device when the closure element is opened. The mounting of the device to the closure element can facilitate re-configuring the interior of the vehicle. For example, the device can be left in place when a row of seats (such as the second row of seats) in the vehicle is folded to increase the load capacity of the vehicle. This arrangement is also useful in vehicles having three rows of seats and in which the seats of the rearmost row are occasional seats which can be stowed when not in use. The occasional seat(s) can be deployed in the load space without the need to remove the load space cover device from the vehicle. Thus, the inconvenience of manually removing and/or manipulating a retractable cover from the load space to accommodate different vehicle configurations may be avoided.

The closure element is associated with a door aperture formed in the body structure of the vehicle. The closure element is movable between an open position and a closed position. The closure element could be a side vehicle door for closing an aperture for passenger ingress/egress. The aperture can, for example, be provided to facilitate loading of the load space. The closure element can be a load bay closure element. For example, the closure element could be a trunk (boot) lid of a vehicle. Alternatively, the closure element can be a tailgate provided at the rear of the vehicle. The tailgate can be hinged to the vehicle about a horizontal axis or a vertical axis. The tailgate can be a split tailgate, for example comprising an upper tailgate and a lower tailgate. The tailgate can be provided at the back of a flat bed or pick-up truck. A biasing mechanism or drive mechanism can be provided for opening and/or closing the tailgate. For example, a gas strut or an electrically powered actuator can be provided.

According to a further aspect of the present invention there is provided a vehicle having a load space, the vehicle comprises a device as described above. The vehicle can comprise a closure element, and the device can be mounted to the closure element. The vehicle can comprise means for driving the cover from the retracted position to the deployed position and/or for driving the cover from the deployed position to the retracted position; and means for coupling the cover to the drive means.

The vehicle can comprise a control unit for controlling the operation of the drive means. The control unit can be configured to control the drive means to control movement of the cover in dependence on the detecting means. The control unit can be configured to deactivate the drive means if the cover is moving when the detecting means detects an object in the path of the cover. The control unit can be configured to activate the drive means if the cover is stationary when the detecting means detects an object on the path of the cover.

A pull bar can be provided at a free edge of the cover. The detecting means can be provided on said pull bar. Furthermore, the fixing means can be provided on said pull bar for releasably fixing the pull bar to the coupling means. The fixing means can for example be in the form of a locking pin or locking recess provided at each end of the pull bar.

According to a further aspect of the present invention there is provided a kit of parts for a vehicle load space cover. The kit comprises a device as described above in combination with means for driving the cover from the retracted position to the deployed position; and means for coupling the cover to the drive means.

According to a yet further aspect of the present invention, there is provided a method of covering a load space of a vehicle, the vehicle comprising a device for covering the load space, the device comprising a cover which is movable between a retracted position in which the load space is uncovered and a deployed position in which the load space is at least partially covered, the device comprising means for detecting an object in the path of the cover; the method comprising controlling displacement of the cover in dependence on said detecting means.

The vehicle can comprise means for driving the cover from the retracted position to the deployed position and/or for driving the cover from the deployed position to the retracted position. The method can comprise controlling said driving means in dependence on the detecting means.

The vehicle can further comprise a control unit. The method can comprise using the control unit to deactivate the drive means if the cover is moving when the detecting means detect an object in the path of the cover. The method can comprise using the control unit to activate the drive means if the cover is stationary when the detecting means detect an object on the path of the cover.

The method may comprise determining a position to which the cover can be deployed in dependence on the detecting means prior to deploying the cover. The detecting means may comprise at least one sensor operable to output a signal indicative of at least one of: a vehicle seat being in a folded/stowed state; a row position of the seat within the vehicle; a position of the seat within the vehicle with respect to a longitudinal axis of the vehicle; and, a position of a headrest of the seat with respect to a backrest of the seat.

The vehicle can further comprise coupling means. The method can comprise using the coupling means to couple the cover to the drive means and driving the cover from the retracted position to the deployed position and/or from the deployed position to the retracted position with the driving means.

According to a still further aspect of the present invention, there is provided a control unit comprising a processor configured to perform the method as described above.

The device has been described with reference to its relative position within the vehicle. The terms "front" and "back" used herein are to be given their usual meaning in relation to a vehicle. Furthermore, the term "forward" (and derivatives thereof) has been used to describe a movement from the rear of the vehicle towards the front of the vehicle. Conversely, the term "rearward" (and derivatives thereof) has been used to describe a movement from the front of the vehicle towards the rear of the vehicle.

According to a further aspect of the present invention there is provided a vehicle having a load space and a closure element, the vehicle comprising: a device for covering the load space, the device comprising a cover which is movable between a retracted position in which the load space is uncovered and a deployed position in which the load space is at least partially covered; wherein the device is mounted to the closure element. When the closure element is opened, the device travels with the closure element. Thus, access to the load space is not obstructed by the device when the closure element is opened.

The mounting of the device to the closure element can facilitate re-configuring the interior of the vehicle. For example, the device can be left in place when a row of seats (such as the second row of seats) in the vehicle is folded to increase the load capacity of the vehicle. This arrangement is also useful in vehicles having three rows of seats and in which the seats of the rearmost row are occasional seats which can be stowed when not in use. The occasional seat(s) can be deployed in the load space without the need to remove the load space cover device from the vehicle. Thus, the inconvenience of manually removing and/or manipulating a retractable cover from the load space to accommodate different vehicle configurations may be avoided.

The vehicle can comprise means for driving the cover from the retracted position to the deployed position. The vehicle can comprise means for coupling the cover to the drive means. A pull bar can be provided at a leading edge of the cover, and fixing means can be provided on said pull bar for releasably fixing the pull bar to the coupling means.

The coupling means can be movable to displace the cover from said retracted position to said deployed position; and/or from said deployed position to said retracted position. The coupling means can be configured to engage the cover when the coupling means is displaced in a forwards direction. The coupling means can, for example, comprise at least one latching device. A latching device can be provided for engaging each side of the cover. The coupling means can be in the form of a latch truck. The vehicle can comprise guide means for guiding the coupling means. The guide means can, for example, comprise a guide channel or rail.

The driving means can be activated to displace the coupling means in a forwards direction to deploy the cover; and/or to displace the coupling means in a rearwards direction to retract the cover. The driving means can comprise one or more electric machines, for example one electric machine can be disposed at each side of the cover. The driving means can be connected to the coupling means, for example by a drive cable or chain.

The coupling means can be configured to couple with and/or de-couple from the cover when the closure element is in a closed position. The coupling means can be configured automatically to couple with the cover when the closure element is closed; and/or automatically to de-couple from the cover when the closure element is opened.

A control unit can be provided for controlling operation of the driving means. The control unit can, for example, control the operating direction of the driving means to control the deployment/retraction of the cover. The control unit can be configured automatically to control the drive means to displace the coupling means in a forwards direction when the closure element is closed. At least in certain embodiments, an initial forwards movement of the coupling means can cause the coupling means positively to engage the cover. The continued forwards movement of the coupling means can displace the cover to said deployed position. Conversely, the control unit can be configured automatically to control the drive means to displace the coupling means in a rearwards direction when the closure element is opened. The rearwards movement of the coupling means can uncover the load space. At least in certain embodiments, continued rearwards movement of the coupling means can cause the coupling means positively to disengage the cover.

The control unit can be configured automatically to displace the coupling means towards the rear of the guide means when the closure element is closed. The coupling means can automatically be displaced to an aft position in which the cover is coupled to said coupling means. Alternatively, the coupling means can automatically be displaced to an aft position in which the coupling means is adjacent to the cover but decoupled from the cover.

In use, the cover can be deployed towards the front of the vehicle and retracted towards the rear of the vehicle. A manual control, such as a button or switch, can be provided to retract the cover partially or completely. This arrangement allows a user seated on a rear seat of the vehicle to easily reach the cover, even when the closure element is closed.

The closure element is associated with an aperture formed in the body structure of the vehicle. The closure element is movable between an open position and a closed position. The closure element could be a vehicle door for closing an aperture for passenger ingress/egress. The aperture can, for example, be provided to facilitate loading of the load space. The closure element can be a load bay closure element. For example, the closure element could be a trunk (boot) lid of a vehicle. Alternatively, the closure element can be a tailgate provided at the rear of the vehicle. The tailgate can be hinged to the vehicle about a horizontal axis or a vertical axis. The tailgate can be a split tailgate, for example comprising an upper tailgate and a lower tailgate. The tailgate can be provided at the back of a flat bed or pick-up truck. A biasing mechanism or drive mechanism can be provided for opening and/or closing the tailgate. For example, a gas strut or an electrically powered actuator can be provided.

The device can be fixedly or removably mounted to the closure element. The device could be integrated into the closure element.

The device can comprise a roller and the cover can comprise a flexible member which is wound onto the roller when the cover is moved to said retracted position. This arrangement facilitates stowage of the cover when the cover is in the retracted position. The device can comprise a housing in which the roller is disposed, the housing can be mounted to the closure element and can comprise an opening through which the cover can deploy to move between the retracted position and the deployed position. The roller can be mounted to the closure element. The roller can be movable vertically relative to the closure element of the vehicle. The device can be integrated into the closure element of the vehicle.

The flexible member can be deployed to extend at least partway over the load space. The flexible member can be sized to enable the door closure member to be opened while the cover is coupled to said coupling means. The additional length of flexible material can, for example, be wound onto said roller. Thus, at least in certain embodiments, the door closure member can be opened and closed with the cover coupled to said coupling means.

One or more pull bars can be provided at a leading edge of the cover. Fixing means can be provided on said pull bar for releasably fixing the pull bar or bars to the coupling means. The fixing means can, for example, be in the form of a locking pin or locking recess provided at each end of the pull bar or bars.

The vehicle can comprise at least one sensor for detecting an object in the path of the cover. The at least one sensor can, for example, comprise a proximity sensor or a contact sensor. The at least one sensor could, for example, be an optical sensor or an ultrasonic sensor for detecting an object in the path of the cover. Alternatively, the at least one sensor could be a mechanical switch, an electrical contact or a capacitive sensor. The control unit can be configured to inhibit movement of the cover to the deployed position when said at least one sensor detects an object in the path of the cover. For example, the control unit can interrupt or deactivate the drive means when said at least one sensor detects an object in the path of the cover. The cover can automatically track the position of a reclining seat, thereby ensuring that, when deployed, the load space (boot) is completely covered.

The vehicle can comprise an override function for selectively engaging/disengaging operation of the device. The override function could, for example, be accessed through a human machine interface (HMI), such as a touch screen in the centre console or instrument cluster.

The closure element can be a vehicle door such as a tailgate or a side opening door. The closure element can be a split tailgate having an upper tailgate and a lower tailgate. The device can be mounted to the upper tailgate. Alternatively, the device could be mounted to the lower tailgate.

According to a further aspect of the present invention, there is provided a device for covering a load space of a vehicle, the vehicle comprising a closure element, the device comprising a cover which is movable between a retracted position in which the load space is uncovered and a deployed position in which the load space is at least partially covered. The device is configured for mounting to the closure element. The device can comprise a roller configured for mounting to the closure element and the cover can comprise a flexible member which is wound onto the roller when the cover is moved to said retracted position. The device can comprise a housing in which the roller is disposed. The housing can be configured for mounting to the closure element and can comprise an opening through which the cover can deploy to move between the retracted position and the deployed position. The roller can be movable vertically relative to the closure element of the vehicle. The device can be configured for integrating into the closure element of the vehicle.

A pull bar can be provided at a leading edge of the cover, and fixing means can be provided on said pull bar for releasably fixing the pull bar to coupling means of the vehicle. The fixing means can, for example, be in the form of a locking pin or a locking recess provided at each end of the pull bar.

The device can comprise at least one sensor for detecting an object in the path of the cover. The at least one sensor could, for example, be an optical sensor or a sonic sensor for detecting an object in the path of the cover. Alternatively, the at least one sensor could be a mechanical switch, an electrical contact or a capacitive sensor.

According to a further aspect of the present invention, there is provided a kit of parts for a vehicle load space cover adapted to be mounted to a closure element of a vehicle. The kit comprises a device as described above, coupling means as described above and drive means as described above.

According to a yet further aspect of the present invention, there is provided a method of covering a load space of a vehicle, the vehicle having a closure element, the vehicle comprising:

a device for covering the load space, the device comprising a cover which is movable between a retracted position in which the load space is uncovered and a deployed position in which the load space is at least partially covered;

the device being mounted to the closure element; and the method comprising deploying the cover outwardly from said closure element to said deployed position.

The device can comprise means for driving the cover from the retracted position to the deployed position. The method can comprise using the coupling means to couple the cover to the drive means. The method can comprise driving the cover from the retracted position to the deployed position with the driving means. The coupling means can be mounted to the vehicle.

The device has been described with reference to its relative position within the vehicle. The terms "front" and "back" used herein are to be given their usual meaning in relation to a vehicle. Furthermore, the term "forward" (and derivatives thereof) has been used to describe a movement from the rear of the vehicle towards the front of the vehicle. Conversely, the term "rearward" (and derivatives thereof) has been used to describe a movement from the front of the vehicle towards the rear of the vehicle.

According to a further aspect of the invention, there is provided a vehicle having a load space, the vehicle comprising a device for covering the load space, the device comprising a cover which is movable between a retracted position in which the load space is uncovered and a deployed position in which the load space is at least partially covered; means for coupling the cover; and means for guiding the coupling means along a predefined path. Said guiding means may be configured such that the coupling means is displaced between a first orientation and a second orientation as it travels along said predefined path, the coupling means being in an open configuration when in said first orientation and in a closed configuration when in said second orientation. The guiding means is thereby configured to adjust the orientation of the coupling means to affect changes from said open and closed configurations. The need for a separate actuator to actuate the coupling means can, at least in certain embodiments, be obviated. In use, the cover can be reliably coupled to the guiding means so that the coupling between the cover and the guiding means is effective. At least in certain embodiments, a reliable deployment of the cover can be achieved.

The coupling means can be configured to receive and/or to release said cover when in said open configuration. The coupling means can be configured to retain said cover when in said closed configuration. The coupling means can undergo rotation as it is displaced between said first and second orientations. The coupling means can rotate about a transverse axis of the vehicle.

The guiding means can comprise at least one elongate guide member. The guide member can be a rail or a channel, for example. The guide member can comprise a front part and a rear part. The rear part of the guiding means can be inclined relative to the front part. The rear part of the guiding means can be inclined downwardly. The downward inclination of the rear part can cause the coupling means to pivot to face towards the rear of the vehicle.

The front part of the guide member can be substantially rectilinear. Alternatively, the front part of the guide member can be curved, for example to curve downwardly behind a second row of seats in the vehicle. The second part can be substantially rectilinear.

The coupling means can be in said first orientation when it is positioned on the rear part of the guide member; and the coupling means can be in said second orientation when it is positioned on the front part of the guide member. Thus, the configuration of the coupling means can depend on its relative position on the guide member.

The device can be mounted to a closure element of the vehicle and arranged such that the cover is introduced into the coupling means when the closure element is closed. The closure element can, for example, be a tailgate. The coupling means can be arranged to travel towards the front of the vehicle to displace the cover to said deployed position. When the closure element is opened, the device can travel with the closure element. Thus, access to the load space is not obstructed by the device when the closure element is opened. The mounting of the device to the closure element can facilitate re-configuring the interior of the vehicle. For example, the device can be left in place when a row of seats (such as the second row of seats) in the vehicle is folded to increase the load capacity of the vehicle. This arrangement is also useful in vehicles having three rows of seats and in which the seats of the rearmost row are occasional seats which can be stowed when not in use. The occasional seat(s) can be deployed in the load space without the need to remove the load space cover device from the vehicle. Thus, the inconvenience of manually removing and/or manipulating a retractable cover from the load space to accommodate different vehicle configurations may be avoided. The rear part of each guide rail can be disposed at or proximal to said closure element of the vehicle for receiving the cover.

In an alternate arrangement, the device can be mounted behind a second row of seats in the vehicle. The coupling means can be arranged to travel towards the rear of the vehicle to displace the cover to said deployed position. The device can be fixedly or removably mounted. In this arrangement, the configuration of the elongate guide member can be reversed such that the front part is inclined downwardly relative to the rear part. The coupling means can be displaced to said open configuration when it is positioned in said front part of the guide member. Thus, the cover can be connected to said coupling means when said coupling means is positioned in said front part of the guide member.

The closure element is associated with an aperture formed in the body structure of the vehicle. The closure element is movable between an open position and a closed position. The closure element could be a side vehicle door for closing an aperture for passenger ingress/egress. The aperture can, for example, be provided to facilitate loading of the load space. The closure element can be a load bay closure element. For example, the closure element could be a trunk (boot) lid of a vehicle. Alternatively, the closure element can be a tailgate provided at the rear of the vehicle. The tailgate can be hinged to the vehicle about a horizontal axis or a vertical axis. The tailgate can be a split tailgate, for example comprising an upper tailgate and a lower tailgate. The tailgate can be provided at the back of a flat bed or pick-up truck. A biasing mechanism or drive mechanism can be provided for opening and/or closing the tailgate. For example, a gas strut or an electrically powered actuator can be provided.

The coupling means can comprise at least one latch truck movable longitudinally along said guide means. The latch truck can comprise first and second guide wheels. The first and second guide wheels can be spaced apart from each other in a longitudinal direction. The latch truck can rotate about a transverse axis as it travels along said guiding means. The latch truck can comprise a hook for engaging the cover, the hook having an opening which is exposed when the latch truck is in said first orientation and which is at least partially obstructed when the latch truck is in said second orientation.

A pull bar can be provided at the leading edge of the cover, and fixing means can be provided on said pull bar for releasably fixing the pull bar to the hook. The fixing means can, for example, be in the form of a locking pin or a locking recess provided at each end of the pull bar.

The vehicle can comprise means for driving the cover from the retracted position to the deployed position. The drive means can, for example, comprise at least one electric machine drivingly connected to said coupling means. A flexible connector, such as a cable or chain, can be provided to connect the drive means to said coupling means. The guide member can also be adapted to retain the flexible connector in a driving configuration. For example, the flexible connector can be disposed in a channel or recess formed in said guide member. The coupling means can couple the cover to said drive means.

A control unit can be provided for controlling operation of the drive means. The control unit can, for example, control the operating direction of the drive means to control the deployment/retraction of the cover. The control unit can be configured automatically to control the drive means to displace the coupling means in a forwards direction when the closure element is closed. At least in certain embodiments, an initial forwards movement of the coupling means can cause the coupling means positively to engage the cover. The continued forwards movement of the coupling means can displace the cover to said deployed position. Conversely, the control unit can be configured automatically to control the drive means to displace the coupling means in a rearwards direction when the closure element is opened. The rearwards movement of the coupling means can uncover the load space. At least in certain embodiments, continued rearwards movement of the coupling means can cause the coupling means positively to dis-engage the cover.

The control unit can be configured automatically to displace the coupling means towards the rear of the guide means when the closure element is closed. The coupling means can automatically be displaced to an aft position in which the cover is coupled to said coupling means. Alternatively, the coupling means can automatically be displaced to an aft position in which the coupling means is adjacent to the cover but decoupled from the coupling means.

According to a further aspect of the present invention, there is provided a deployment apparatus for deploying a load space cover from a retracted position to a deployed position, the apparatus comprising means for coupling with the cover; and means for guiding the coupling means along a predefined path. Said guiding means is configured such that the coupling means is displaced between a first orientation and a second orientation as it travels along said predefined path, the coupling means being in an open configuration when in said first orientation and in a closed configuration when in said second orientation.

According to a yet further aspect of the present invention, there is provided a method of covering a load space of a vehicle as described herein, the method comprising coupling the cover to said coupling means; and displacing the coupling means along said predefined path to move the cover from said retracted position to said deployed position. The guiding means causes said coupling means to be displaced from said first orientation to said second orientation as it is travels along said predefined path.

The device has been described with reference to its relative position within the vehicle. The terms "front" and "back" used herein are to be given their usual meaning in relation to a vehicle. Furthermore, the term "forward" (and derivatives thereof) has been used to describe a movement from the rear of the vehicle towards the front of the vehicle. Conversely, the term "rearward" (and derivatives thereof) has been used to describe a movement from the front of the vehicle towards the rear of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which:

FIGS. 10A and 10B illustrate an alternate operating mode in which the cover remains connected to the closure element when it is opened.

DETAILED DESCRIPTION

Figure 1:
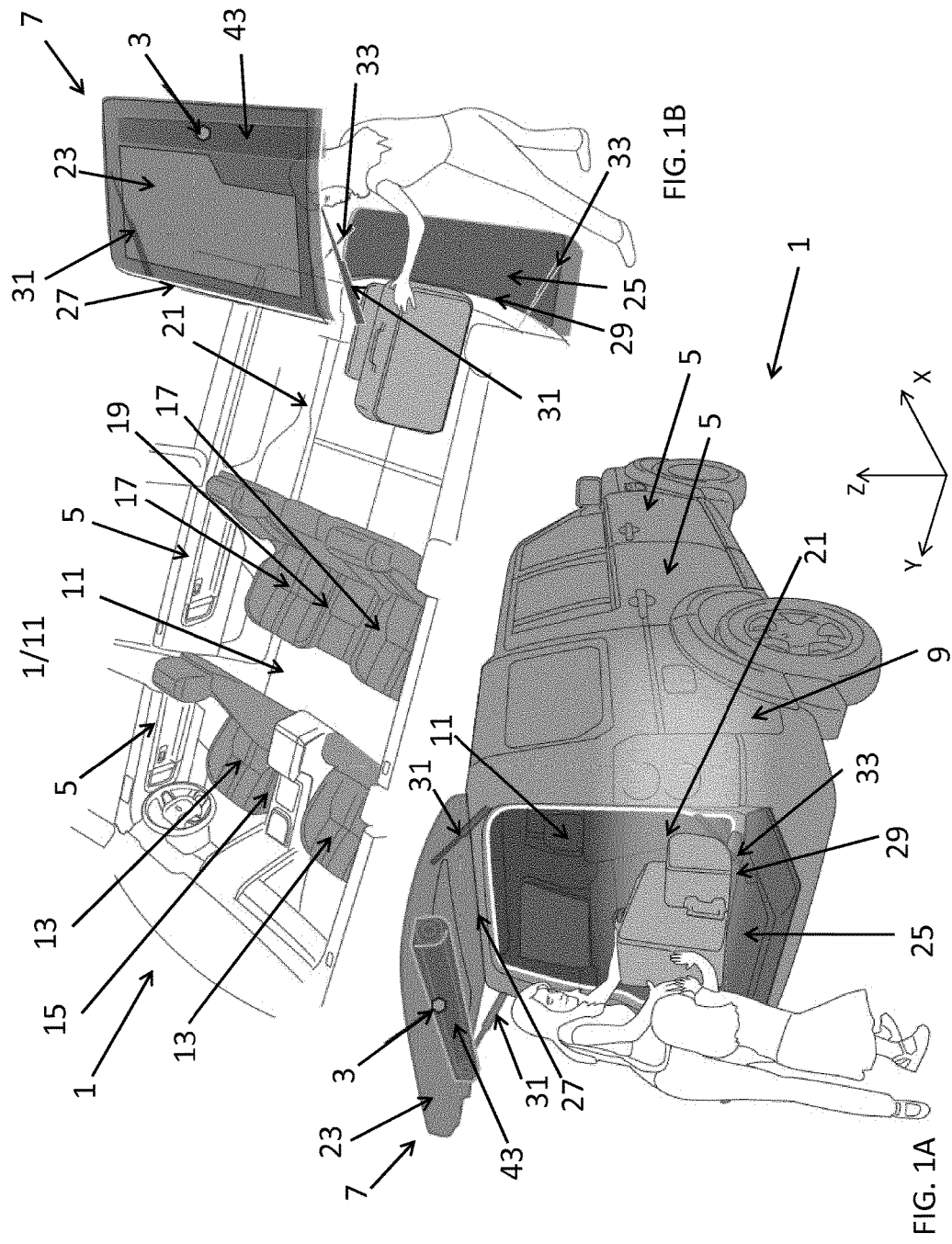
FIG. 1A shows a rear perspective view of a vehicle incorporating a load space covering device in accordance with a first embodiment of the present invention.
FIG. 1B shows a partial sectional view of the vehicle shown in FIG. 1A.
Figure 2:
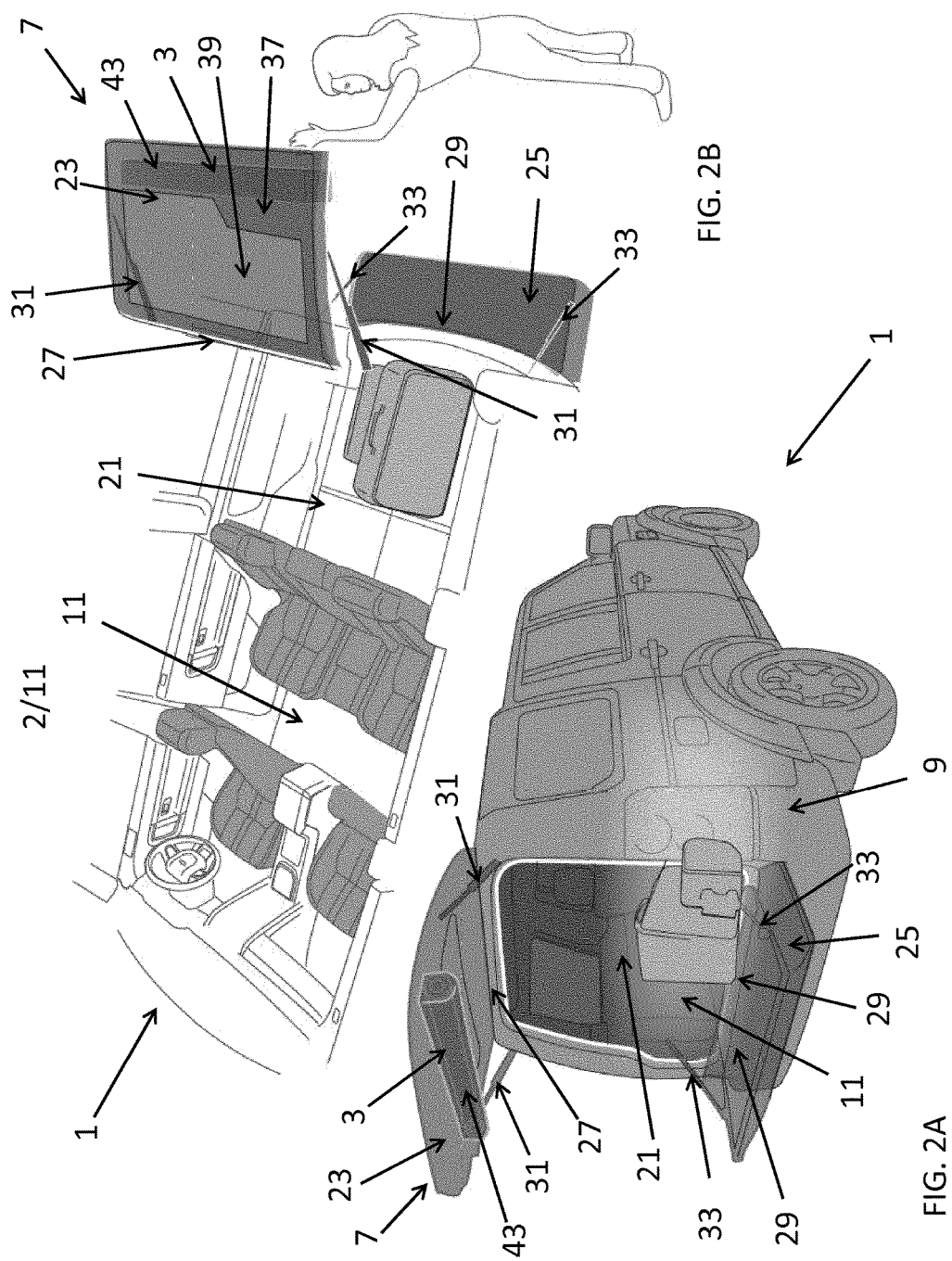
FIG. 2A shows the rear perspective view shown in FIG. 1A with the tailgate ready to be closed.
FIG. 2B shows the partial sectional view of FIG. 1B with the tailgate ready to be closed.

A motor vehicle 1 incorporating a load space covering device 3 in accordance with a first embodiment of the present invention will now be described with reference to FIGS. 1A to 4B. The covering device 3 is described herein with reference to the major axes of the vehicle 1, namely a longitudinal axis X, a transverse axis Y and a vertical axis Z (shown in FIG. 1A). Furthermore, references herein to "left" and "right" refer to the corresponding sides of the vehicle 1 when looking from the rear of the vehicle 1 towards the front.

The vehicle 1 is a three or five-door vehicle such as a sport utility vehicle (SUV). The vehicle 1 in the present embodiment has four side doors 5 and a closure element in the form of a tailgate 7. As shown in FIG. 1A, the vehicle 1 has a vehicle body structure 9 which defines a vehicle inner volume 11. As shown in FIG. 1B, the vehicle inner volume 11 comprises two front seats 13 extending along a first row 15 and two/three rear seats 17 extending along a second row 19. A load space 21 is provided in the vehicle inner body 11 behind the second row 19, for example for loading luggage. The load space 21 is defined by the second row 19, by the vehicle body structure 9 at its left, right, upper and lower sides and by the tailgate 7. In a variant (not shown), the vehicle 1 comprises a third row of seats disposed behind the second row 19. In this variant, the seats of the third row can be occasional seats which can be stowed when not in use for increasing storage capacity of the load space 21.

The tailgate 7 of the vehicle 1 according to the first embodiment is provided for closing the load space 21 of the vehicle 1. As shown in FIGS. 1A and 1B, the tailgate 7 is a split tailgate comprising an upper tailgate 23 and a lower tailgate 25. The upper tailgate 23 is mounted to the vehicle body structure 9 by hinges (not shown) disposed along the upper edge 27 of the upper tailgate 23 so as to pivot upwardly to an open position. The lower tailgate 25 is mounted to the vehicle body structure 9 by hinges (not shown) disposed along the lower edge 29 of the lower tailgate 25 so as to pivot downwardly to an open position. Left and right struts 31 extend from the vehicle body structure 9 to the distal end of the upper tailgate 23. The struts 31 in the present embodiment are electrically actuated to provide automated opening and/or closing of the upper tailgate 23. A hydraulically or pneumatically actuated strut could be used in place of an electric drive motor. Alternatively, the struts 31 could be gas or spring-biased to assist opening of the upper tailgate 23. Left and right cables 33 extend from the vehicle body structure 9 to the distal end of the lower tailgate 25. As shown in FIG. 2B, the upper tailgate 23 has a support frame 37 which supports a rear window 39 of the vehicle 1. Optionally, a sensor (not shown) can be provided on the tailgate 7 to detect when the tailgate 7 is closed.

As shown in FIG. 3A to 4B, the covering device 3 according to the first embodiment of the present invention comprises a cover 41 for covering the load space 21 of the vehicle 1. The cover 41 is a flexible member, for example a fabric, which can be deployed to cover the load space 21. The cover is disposed within a cassette 43 which is mounted to an inner side 45 of the upper tailgate 23 (i.e. to the side of the upper tailgate 23 which faces the vehicle inner volume 11 when the tailgate 7 is in the closed position). A shown in FIG. 5, the cassette 43 is formed with a cassette housing 47 which extends transversely and which defines a hollow volume 49. The cassette housing 47 comprises a mounting plate 51 for mounting to the inner side 45 of the upper tailgate 23, for example below the rear window 39. The cassette housing 47 extends transversely across the upper tailgate 23. Moreover, a roller 53 is provided within the hollow volume 49 of the cassette housing 47. The roller 53 is mounted on fixed end plates 54 and is rotatable about a central axis Y' arranged substantially parallel to the transverse axis Y of the vehicle 1. The roller 53 is provided for supporting the cover 41. More precisely, the cover 41 is rolled up about the roller 53. A spring biasing mechanism (not shown) is provided to retract the cover 41 onto the roller 53.

The cover 41 comprises a leading (free) edge 55 and a fixing edge (not shown) opposite to the leading edge 55. The fixing edge is attached to the roller 53 to secure the cover 41. The leading edge 55 has a pull bar 57 extending transversely, parallel to the roller 53. The pull bar 57 comprises left and right side ends 59. Each end 59 comprises a recess (not shown) provided to couple with a latch mechanism 61L of the vehicle 1, as will be explained in more detail below.

Figure 5:
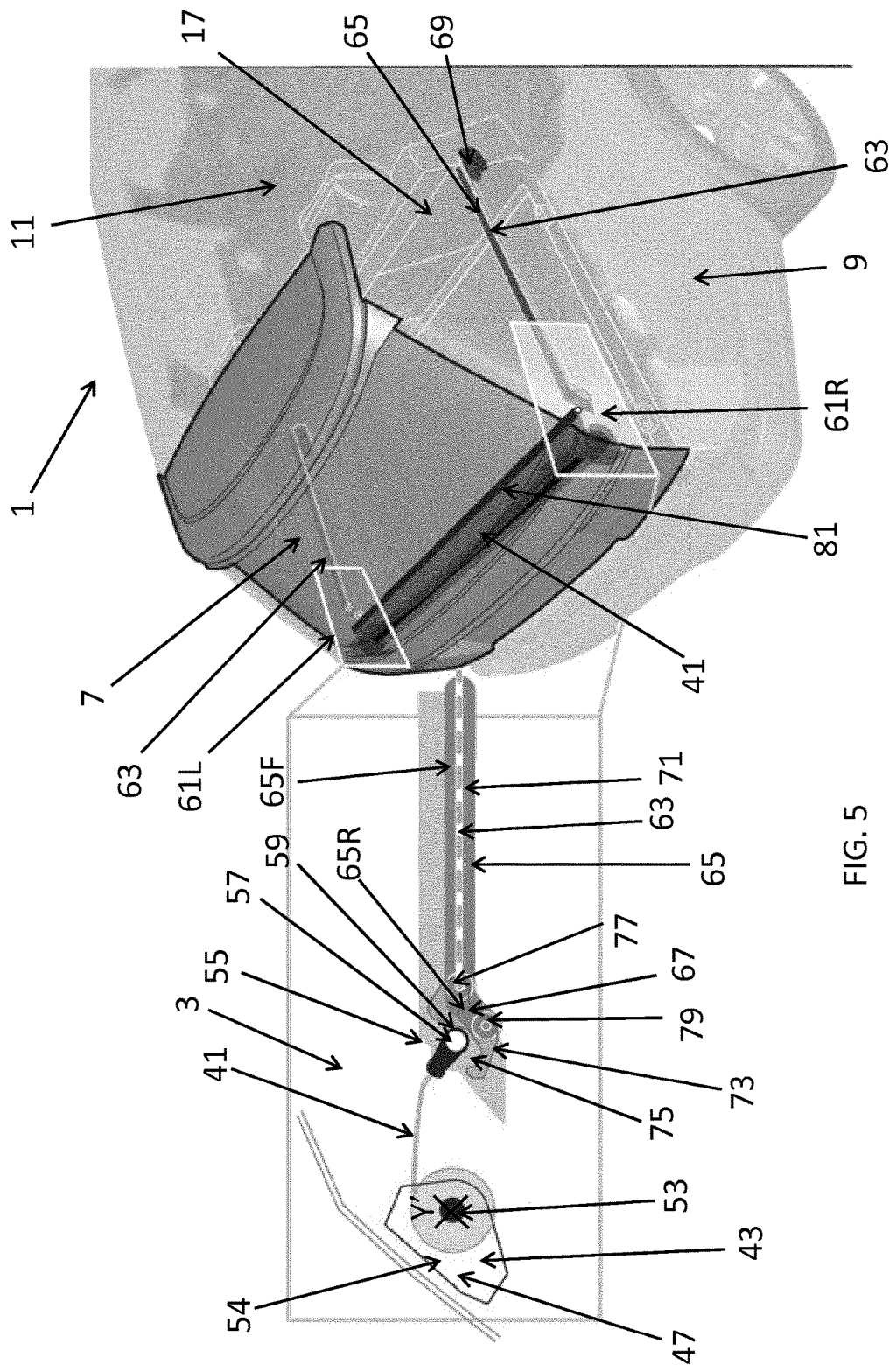
FIG. 5 illustrates the latch truck in a rearward position with the cover decoupled from the latch truck.

As illustrated in FIG. 5, the vehicle 1 according to the present embodiment comprises coupling means in the form of left and right latch mechanisms 61L, 61R provided for engaging and drivingly displacing the cover 41 above the load space 21 of the vehicle 1. The latch mechanisms 61L, 61R are connected to cables 63 which are slidingly guided in respective guide rails 65 provided on the left and right hand sides of the vehicle. The latch mechanisms 61L, 61R in the present embodiment take the form of latch trucks 67 which are connected to the cable 63. A drive means in the form of a motor 69 is disposed at the front of each guide rail 65 and connected to the corresponding cable 63 to drive the latch mechanisms 61L, 61R. The motor 69 can be operated to drive the cable 63 backwards and forwards in the guide rail 65.

The guide rails 65 are mounted to each side of the vehicle body structure 9, inside the vehicle 1, and extend substantially parallel to the longitudinal axis X, from proximal to the tailgate 7 to the back of the rear seats 17. A front section 65F of each guide rail 65 has a general rectilinear shape and comprises a longitudinal channel 71 for receiving the cable 63. A rear section 65R of each guide rail 65 is inclined downwardly towards the floor of the load space 21. The cable 63 extends longitudinally and is arranged to travel within the corresponding longitudinal channel 71. The latch truck 67 is coupled to the rear end of the cable 63.

The latch trucks 67 on each side of the vehicle 1 have the same configuration and only one of them will now be described for brevity. The latch truck 67 comprises a hook 73 which is operable to engage one end 59 of the pull bar 57. The hook 73 has a concave region 75 facing upwardly and arranged to receive the end 59 of the pull bar 57. The latch truck 67 has a front wheel 77 and a rear wheel 79 having substantially similar diameters. The latch truck 67 is connected to the cable 63 through the front wheel 77. The cable 63 is connected to the motor 69, so that when the motor 69 is energized, the cable 63 is driven backwards or forwards within the longitudinal channel 71. As will be explained in more detail below, the latch truck 67 is operable to engage the end 59 of the pull bar 57 when the tailgate 7 is closed.

An electronic control unit (not shown) is provided in the vehicle 1 for controlling the operation of the motors 69. In particular, the control unit can selectively activate the motors 69 and control the direction in which they rotates, thereby determining whether the latch trucks 67 are driven forwards or backwards. The control unit accesses operational data published to the controller area network (CAN) bus to determine the operational status of vehicle systems. The control unit can optionally monitor the operational position of the tailgate 7 (open or closed) in dependence on actuation of a switch provided on the tailgate 7. The control unit can optionally monitor control signals to open/close the tailgate 7, for example in dependence on user-activation of a tailgate control button. The control unit can be configured to provide automated control of the covering device 3.

The control unit can optionally be coupled to a position monitoring unit configured to determine the position of each said latch truck 67. The position monitoring unit can comprise one or more sensors for directly or indirectly monitoring the position of the latch trucks 67. A rotary sensory, such as a Hall effect sensor or an optical sensor, can be provided to monitor operation of each motor 69 (for example, to detect the number of revolutions completed) to determine the relative position of the associated latch truck 67. The rotary sensor can, for example, produce counted pulse signals each representing a relative position of the latch truck 67. Alternatively, or in addition, a sensor can be provided on each latch truck 67 to monitor its movement along the guide rail 65. A rotary sensor, such as a Hall effect sensor or an optical sensor, could monitor rotation of one of the wheels 77, 79 of the latch truck 67.

In the present embodiment, the cover 41 has an auto-detect strip 81 provided at the leading edge 55 of the cover 41. The auto-detect strip 81 extends along the leading edge 55 of the cover 41. The auto-detect strip 81 comprises one or more sensors (not shown) for sensing any obstacle inside the vehicle 1 disposed on the path of the cover 41, such as the back of the rear seats 17 or an item disposed in the load space. The auto-detect strip 81 is provided for determining when the leading edge 55 of the cover 41 encounters an obstacle or obstruction, such as the back of the rear seats 17. The auto-detect strip 81 can comprise one or more of the following sensors: a mechanical switch, an electrical contact, or a capacitive sensor. In the present embodiment, a capacitive strip is provided on the leading edge 55 of the cover 41. The capacitive strip can be used in conjunction with the position monitoring unit described herein. Alternatively, or in addition, the current/voltage drawn by the motor 69 could be monitored to determine when movement of the cover 41 is obstructed. The control unit could, for example, inhibit operation of the motors 69 if the current drawn exceeds a predetermined threshold. The predetermined threshold can, for example, be based on a typical operating current of one or both of said motor 69. If the drive current drawn via the control unit exceeds the predetermined threshold, this can indicate that one or both of the motors 69 has stalled, for example due to the movement of the cover 4 being inhibited. The control unit can operate to deactivate the motors 69 in this scenario. Similarly, if the auto-detect strip 81 detects an obstruction, the control unit can deactivate the motors 69. Rather than monitor the current drawn by the motor 69, an electrical switch could be provided at one or both ends of the guide rail 65 to determine when the latch truck 67 reaches an end thereof.

The auto-detect strip 81 outputs a detection signal to the control unit to indicate when an object is detected. If the motor 69 is operating to deploy the cover 41 when the detection signal is received, the control unit can de-activate the motor 69 to cease deployment of the cover 41. The control unit could optionally also reverse the operating direction of the motor 69 to retract the cover 41 a predetermined distance to space the cover 41 from the obstacle. If the motor 69 is not operating to deploy the cover 41 when the detection signal is received, the control unit can activate the motor 69 to retract the cover 41. A user could activate the auto-detect strip 81 to retract the cover 41.

At least in certain embodiments, the control unit can control the motors 69 independently of each other. This control functions allows the control unit to maintain the pull bar 57 in a transverse arrangement (i.e. substantially parallel to the transverse axis Y of the vehicle 1). The control unit can implement a reset or calibration function to determine an end-stop position of the latch truck 67 in order to maintain the pull bar 57 in the appropriate (i.e. transverse) alignment. An anti-trap algorithm can be used to ensure a correct alignment of the pull bar. The control unit performs an initialization routine in which the latch truck 67 is driven forwards and backwards until a stall condition is detected for the drive motor 69 on each side of the vehicle. The control unit can thereby determine the end travel positions of the latch trucks 67 on each side of the vehicle. The control unit subsequently utilizes the determined end travel positions to control the respective drive motors 69 to maintain the latch trucks 67 in the same longitudinal positions to ensure that the pull bar 57 remains in said transverse orientation. The control unit can periodically repeat this calibration to compensate for count drift over time. Anti-trap algorithms of this type are employed to control operation of electric sunroofs, side windows, powered closures, convertible tops etc.

The operation of the load space covering device 3 in accordance with the first embodiment of the present invention will now be described with reference to FIGS. 1A to 9.

Figure 3:
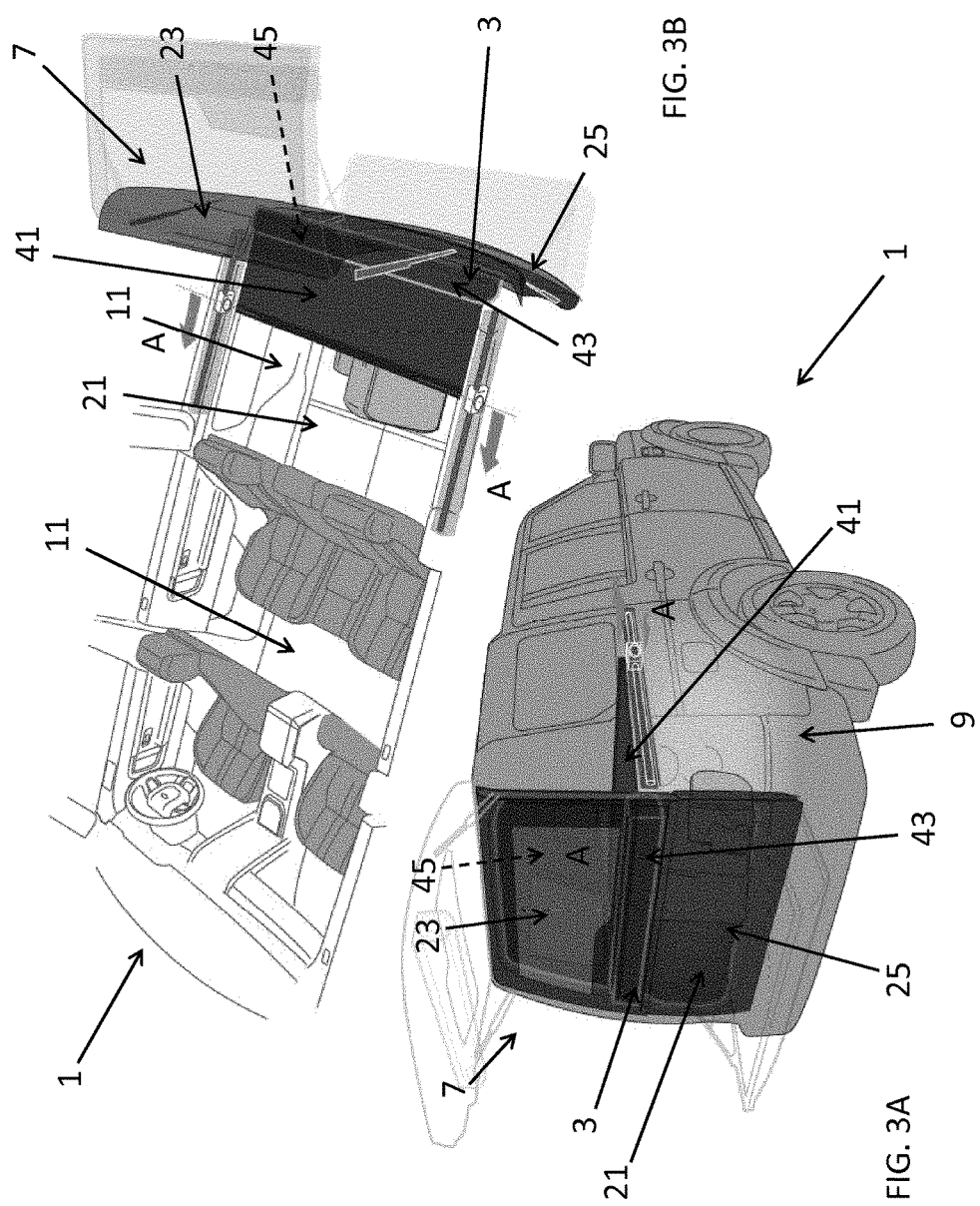
FIG. 3A shows the rear perspective view shown in FIG. 1A with the tailgate in a closed position and the covering device partially deployed.
FIG. 3B shows the partial sectional view of FIG. 1B with the tailgate in a closed position and the covering device partially deployed.
Figure 4:
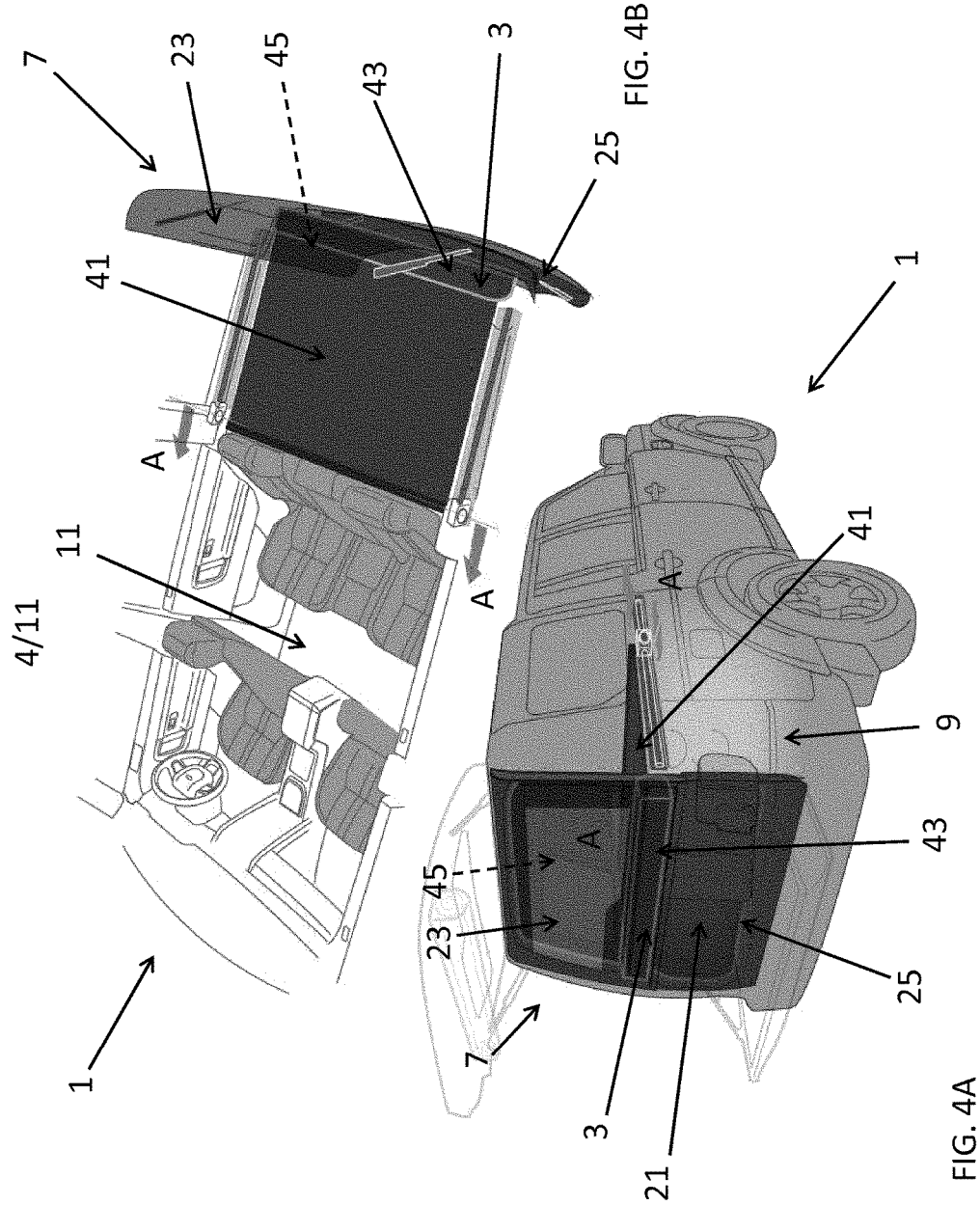
FIG. 4A shows the rear perspective view shown in FIG. 1A with the tailgate in a closed position and the covering device in a fully deployed position.
FIG. 4B shows the partial sectional view of FIG. 1B with the tailgate in a closed position and the covering device in a fully deployed position.

Initially, as shown in FIGS. 1A and 1B, the tailgate 7 of the vehicle 1 is opened so that objects can be loaded in the load space 21 at the rear of the vehicle 1. As shown in FIGS. 2A and 2B, the objects are moved into the load space 21 to allow the tailgate 7 to be closed. The lower tailgate 25 is pivoted upwardly and then the upper tailgate 23 is pivoted downwardly to close the load space 21, as shown in FIGS. 3A and 3B. The closure of the tailgate 7 could be performed manually or by activating a tailgate operating button, for example inside the load space 21. When the tailgate 7 is closed, the sensor disposed on the tailgate 7 sends a signal to the control unit which is configured to output an activation signal to the motors 69. The motors 69 on each side of the vehicle 1 are activated to retract the cable 63, thereby driving the latch trucks 67 forwards to couple with respective ends 59 of the pull bar 57 as it is driven forwards. Then the cover 41 is drawn forwards above the load space 21, as illustrated by the arrows A represented in FIGS. 3A to 4B. More precisely, the motors 69 drive the cable 63 forwards, and the cover 41 is thereby pulled forwards until the sensors of the auto-detect strip 81 detect an obstacle on the path of the cover 41, for example the back of the rear seats 17 or an item stored in the load space 21. When an obstacle is detected, the sensors of the auto-detect strip 81 send a signal to the control unit which in return sends a deactivation signal to the motors 69 to deactivate the motors 69.

Figure 6:
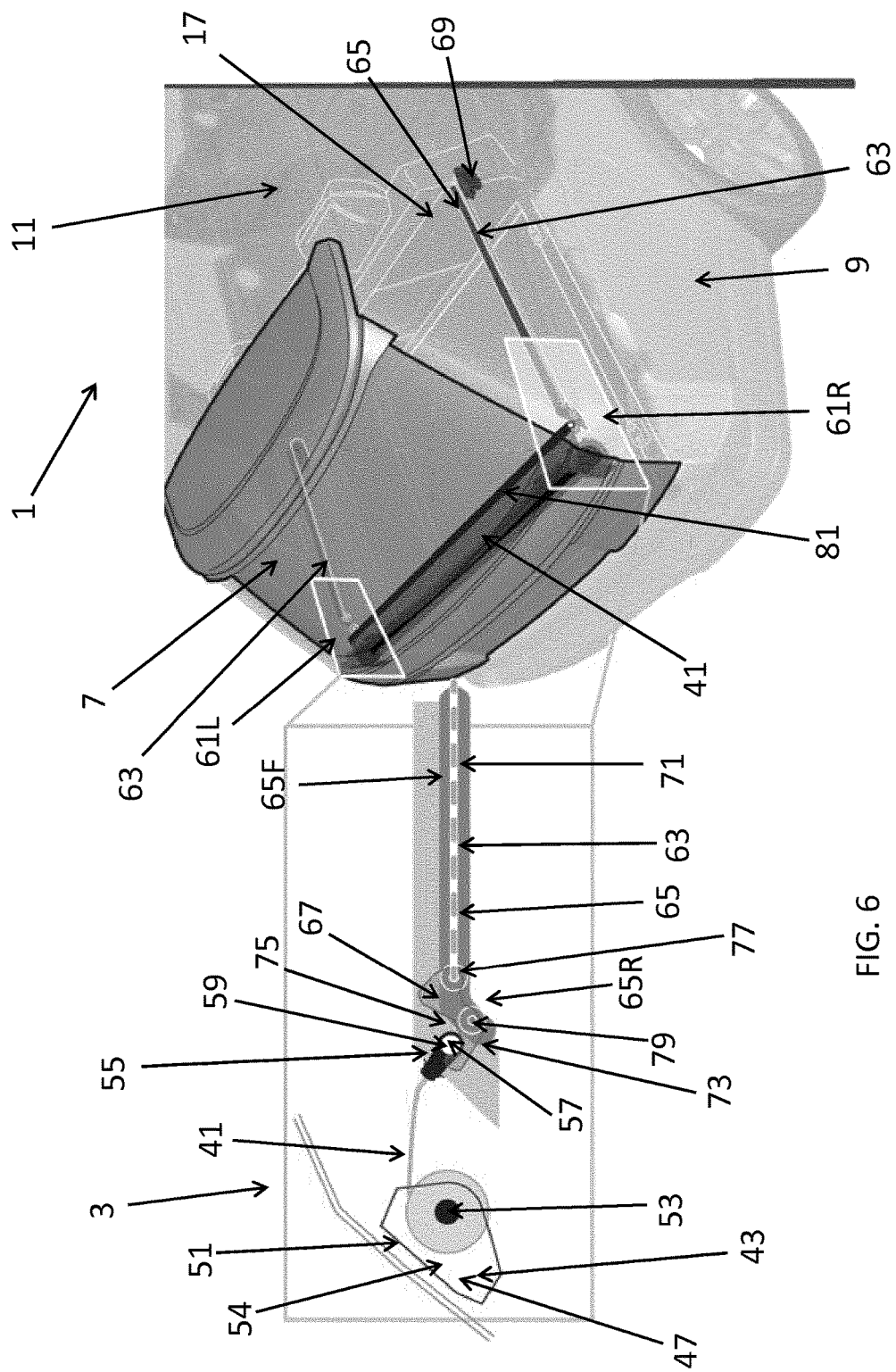
FIG. 6 illustrates the latch truck advanced from the position shown in FIG. 5 to engage the cover.
Figure 7:
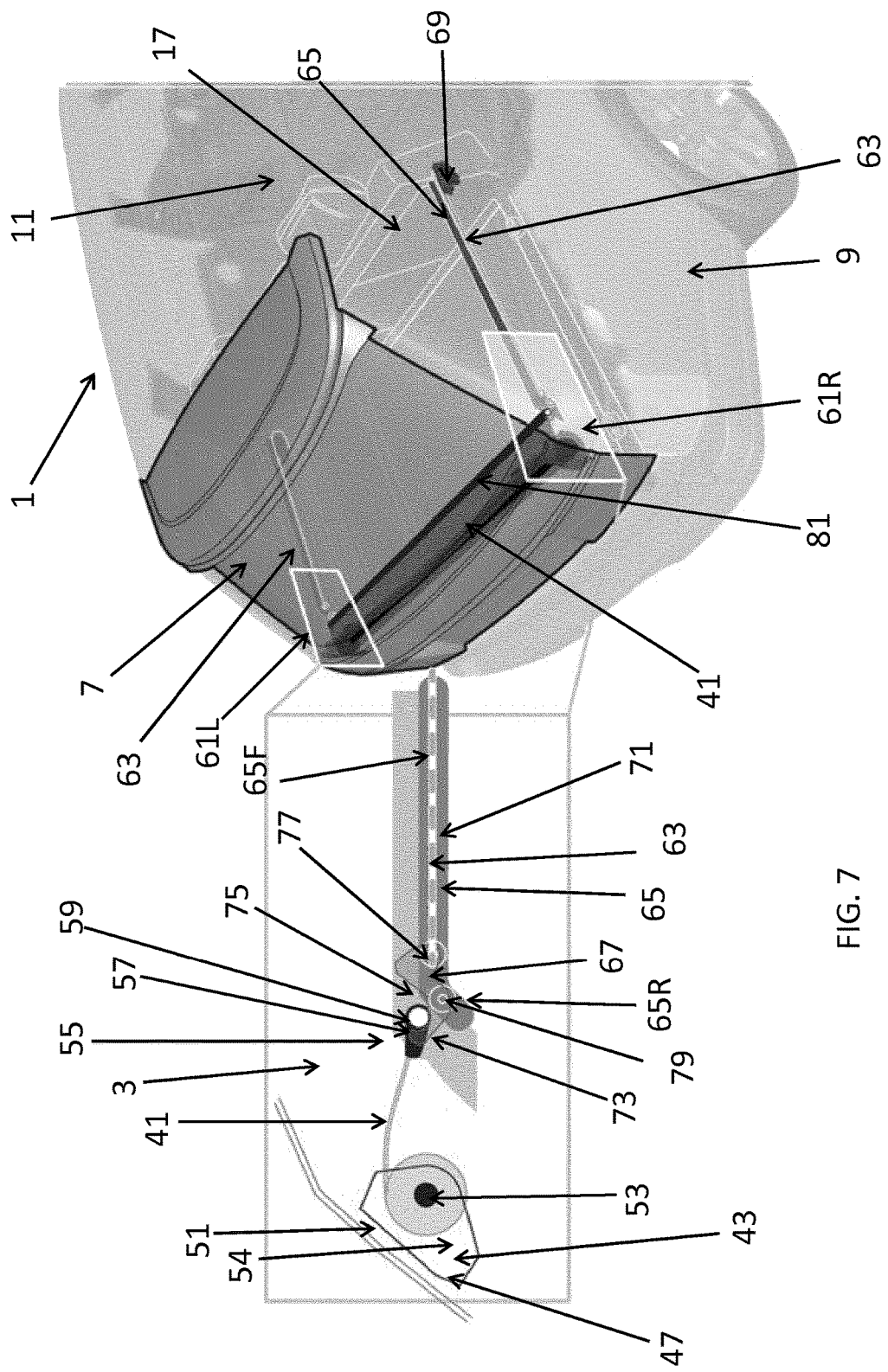
FIG. 7 illustrates the latch truck advanced from the position shown in FIG. 6 to couple with the cover.
Figure 8:
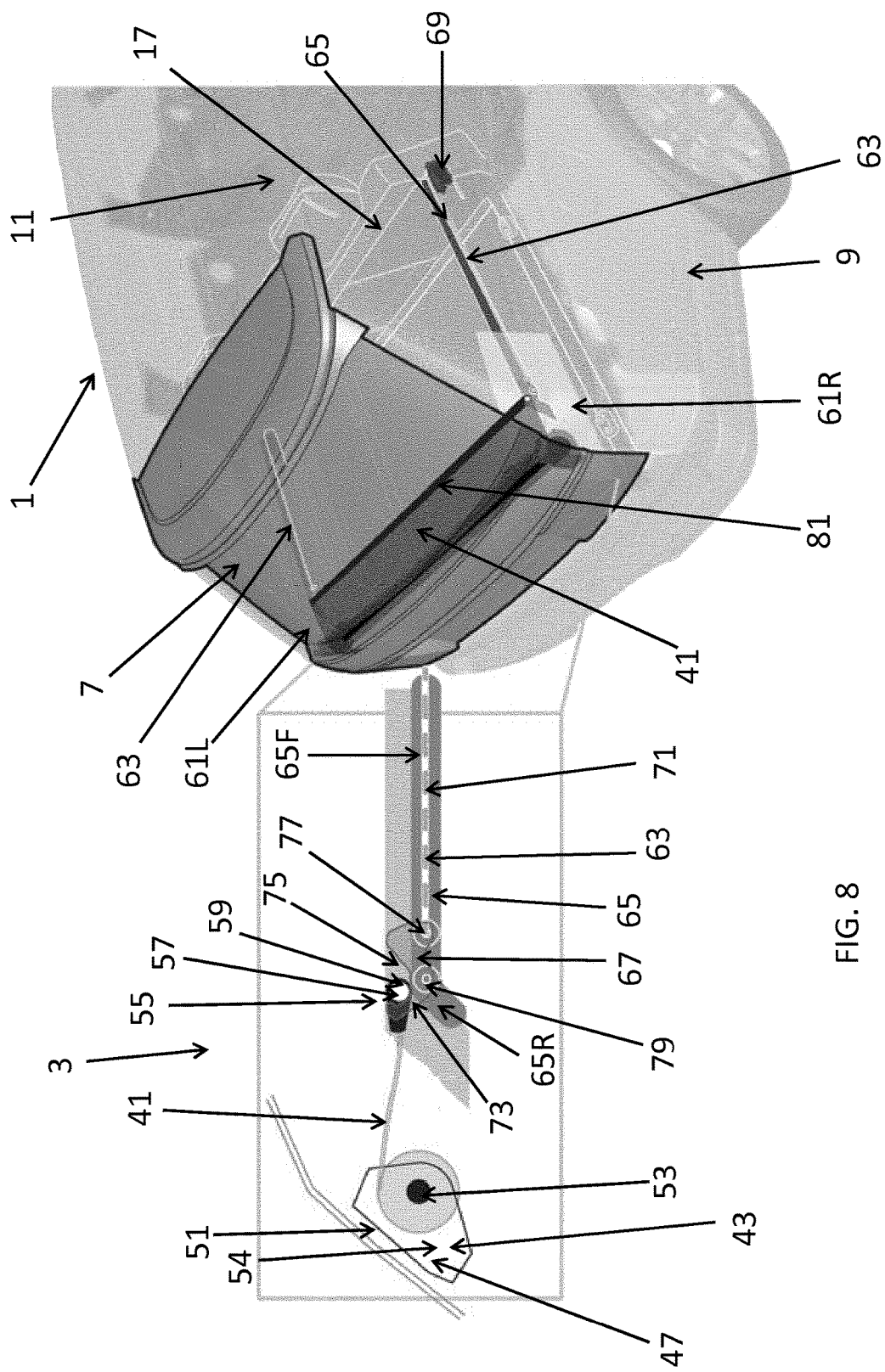
FIG. 8 illustrates the latch truck advanced from the position shown in FIG. 7 to initiate deployment of the cover.
Figure 9:
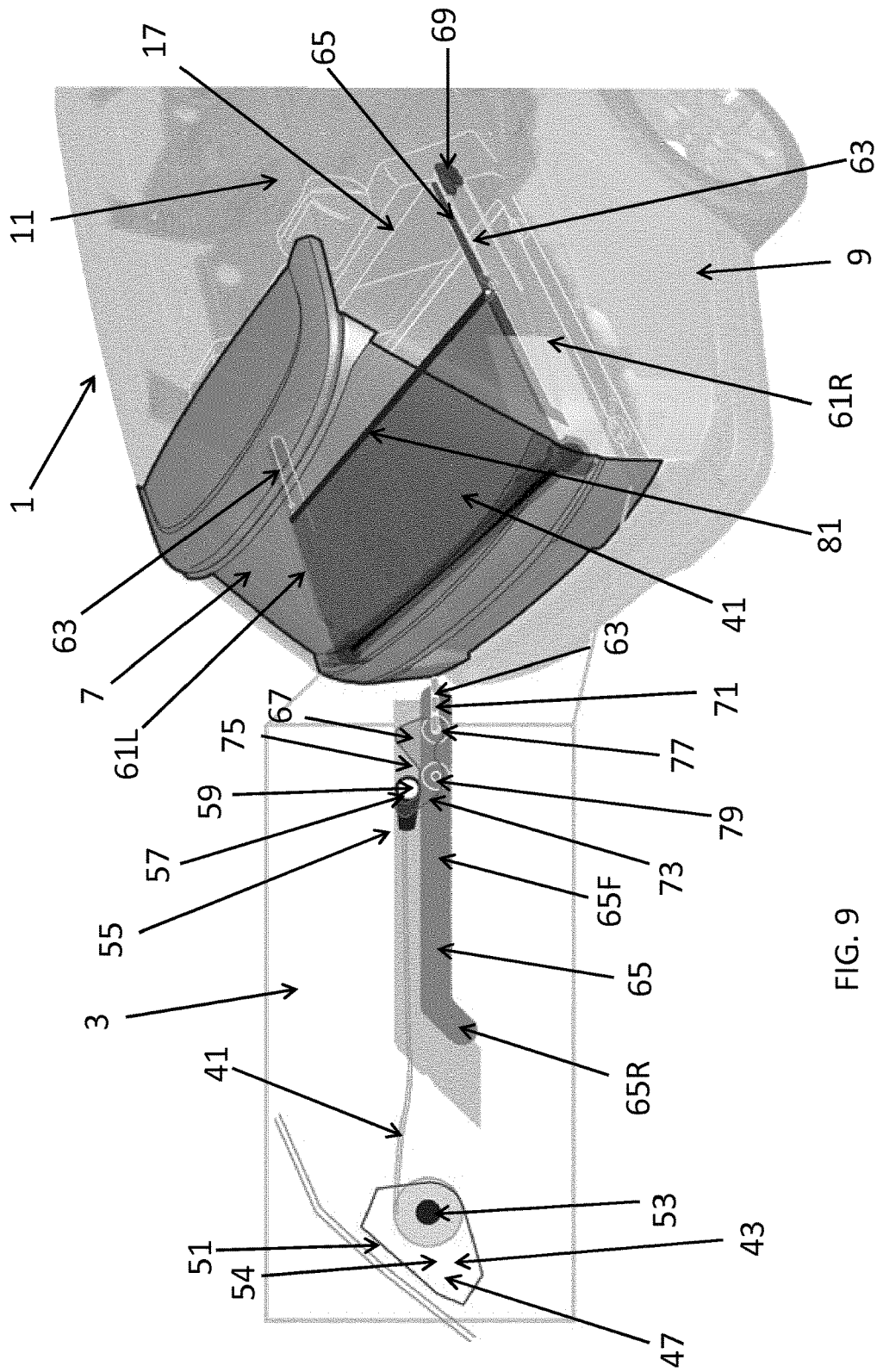
FIG. 9 illustrates the latch truck advanced from the position shown in FIG. 8 with the cover partially deployed.

FIGS. 5 to 9 show in more details the operation of the coupling of the left hand latch mechanism 61L with the cover 41. Initially, the latch truck 67 is located in the rear portion 65R of the guide rail 65 and the ends 59 of the pull bar 57 are located in the hook 73, as shown in FIG. 5. The rear portion 65R is inclined downwardly towards the rear of the vehicle 1 such that, when the latch truck 67 is located therein, the concave region 75 of the hook 73 is open towards the rear of the vehicle 1 thereby permitting the ends 59 of the pull bar 57 to be introduced into the hook 73 when the upper tailgate 23 is closed; or removed from the hook 73 when the upper tailgate 23 is opened. As the latch truck 67 travels from the rear portion 65R to the front portion 65F of the guide rail 65, the hook 73 pivots to retain the ends 59 of the pull bar 57, as shown in FIGS. 6 and 7. The continued operation of the motor 69 retracts the cable 63 and drives the latch truck 67 forwards along the front portion 65F. The cover 41 is thereby carried towards the front of the vehicle 1, as shown in FIGS. 8 and 9, until the auto-detect strip 81 detects the back of the rear seats 17, or any other obstacle disposed in the path of the cover 41. The operation of the right hand latch mechanism 61R is the same.

To uncover the load space 21, the control unit sends an activation signal to the motors 69. The motors 69 on each side of the vehicle 1 are activated, and, in conjunction with the spring biasing mechanism provided in the cassette housing 47, drive the cables 63 backwards, thereby driving the latch trucks 67 rearwards, towards the tailgate 7. The cover 41 is thereby drawn backwards and wound onto the roller 53. The rearwards movement of the latch trucks 67 continues until they are displaced into the rear portion 65R of the guide rail 65. The rotation of the latch trucks 67 as they enter the respective rear sections 65R opens the concave region 75 of the hooks 73 on each side. The ends 59 of the pull bar 57 are no longer positively engaged by the hook 73 such that the pull bar 57 can be released from the latch truck 67 when the upper tailgate 23 is opened. During the deployment and/or retraction of the cover 41, the longitudinal position of the latch truck 67 in the guide rail 65 can be monitored by the position monitoring unit.

Alternatively, as shown in FIGS. 10A and 10B, the tailgate 7 can be opened and closed while the cover 41 is coupled to the latch truck 67. The cover 41 can comprise additional material which can, for example, be wound onto the roller 53. In FIG. 10A, the dashed lines represent the cover 41 at different stages of its course during the opening of the tailgate 7 while the cover 41 is coupled to the latch truck 67.

The control unit can be configured to uncover the load space in dependence on a user request. The control unit can operate in dependence on a user-activated tailgate control switch (for example, disposed in the vehicle or on a remote control, such as a vehicle access fob) arranged to open the lower tail gate 21 and/or the upper tail gate 23.

The control unit can be configured to control the motors 69 to displace the latch trucks 67 in a rearwards direction more quickly that they are displaced in a forwards direction. Thus, the retraction of the cover 41 can be performed more quickly than the deployment of the cover 41. This approach is desirable to reduce the total time required to retract the cover 41 and to open the tailgate 7. It is envisaged that a total time of 7 seconds for retraction of the cover 41 and raising the upper tailgate 23 would be reasonable.

Figure 11:
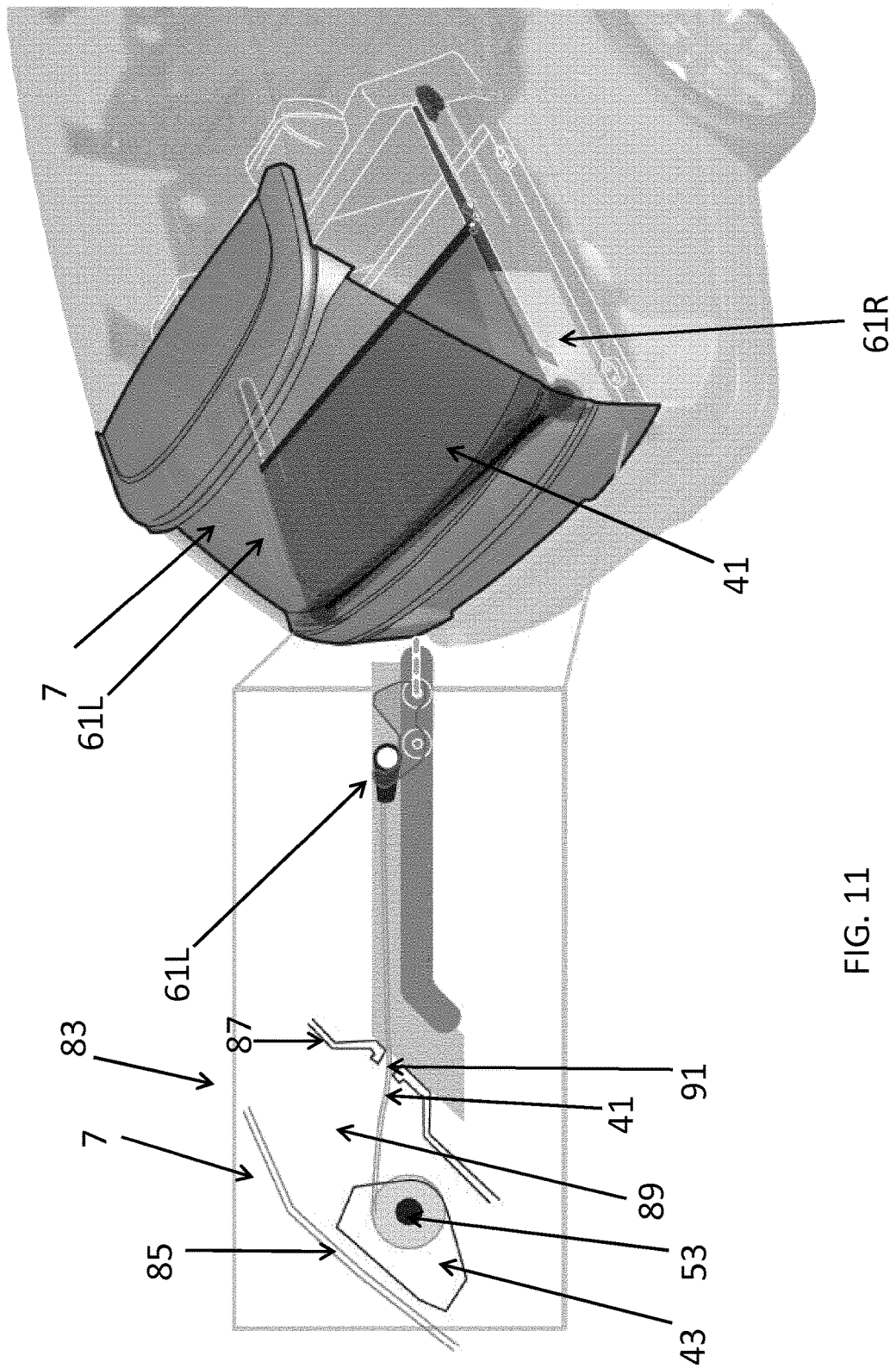
FIG. 11 illustrates a load space covering device in accordance with a second embodiment of the present invention.

A second embodiment of the covering device according to the present invention is shown in FIG. 11. Only the differences in relation to the first embodiment are described below. In this second embodiment, the tailgate 7 comprises a tailgate body 83. The tailgate body 83 comprises an outer portion 85 and an inner portion 87 and defines a tailgate inner volume 89. The inner portion 87 comprises a transverse opening 91. The cassette 43 is integrated into the inner volume 89 of the tailgate 7, and the cover 41 can deploy itself through the transverse opening 91. The retractable cover 41 is again wound onto a roller disposed within the tailgate inner volume. In a variant, the cassette could be omitted, and the transverse roller could be directly mounted to fixed end plates of the tailgate in the tailgate inner volume.

It will be appreciated that various changes and modifications can be made to the load space covering device described herein without departing from the scope of the present application.

A single switch could be provided to move the cover towards the retracted position and to open the tailgate in parallel.

The cassette could be mounted to the lower tailgate. The tailgate could be formed in only one part mounted to the vehicle body structure along its upper edge so as to pivot upwardly to the open position. In a variant, the cassette could be omitted, and the transverse roller could be directly mounted to the inner side of the upper tailgate.

The guide rail could be non-linear. The guide rail could have a curved or inclined portion at its forward end. The curved or inclined portion could drop down towards the floor of the load space, for example behind the rear seats of the vehicle.

The auto-detect strip could be coupled with the motor, for example to deactivate the motor when the auto-detect strip encounters an obstacle.

The coupling between the pull bar and the motor could be electromagnetic.

In embodiments, the seat of the vehicle includes a seat base, a backrest and optionally a headrest. Each component of the seat may be moved independently of each other such that the seat may be moved between a number of positions, relative to the vehicle. Some of the possible seat positions may encroach into the path of the load space cover, thereby inhibiting its movement, whereas others allow the cover to be fully deployed.

The seat may be a second or a third row seat of the vehicle. The seat may be slidably mounted, such that it can be moved relative to a longitudinal axis of the vehicle.

In embodiments the seat may be placed in a stowed position in which the seat may be folded into the floor. In the stowed position the backrest may lie flat adjacent to the seat base.

In embodiments the back rest may be pivoted, relative to the seat base. It may be folded forward to as to overlie the seat base.

In embodiments, the head rest may be movable, relative to the backrest of the seat such that it can be extended and retracted along a substantially longitudinal axis of the backrest.

In embodiments, the detecting means may comprise one or more seat position sensors, which are operable to output a signal indicative of the position of the seat of the vehicle. For example, the sensor may be a seat base position sensor, configured to detect the position of the seat base with respect to a longitudinal axis of the vehicle; a backrest position sensor, configured to detect the position of the backrest relative to the seat base; a seat row position sensor, configured to detect the position of the seat within the second and/or third row of the vehicle; and, a headrest position sensor, configured to detect the position of a headrest with respect to the backrest of the seat. The detecting means may comprise a sensor operable to output a signal indicative of a seat being in a stowed state i.e. folded flat into the load bay of the vehicle.

The invention claimed is:

1. A device for covering a load space of a vehicle, the device comprising:
   a cover which is movable between a retracted position in which the load space is uncovered and a deployed position in which the load space is at least partially covered; and
   a sensor for detecting an object in the path of the cover and/or which may interfere with the movement of the cover;
   wherein the sensor comprises at least one cover sensor disposed on the cover and at least one seat position sensor operable to output a signal indicative of a seat of the vehicle being disposed within the path of the cover, wherein the signal is indicative of at least one of: a vehicle seat being in a folded/stowed state; a row position of the seat within the vehicle; a position of the seat within the vehicle with respect to a longitudinal axis of the vehicle; and, a position of a headrest of the seat with respect to a backrest of the seat.

2. A device as claimed in claim 1, further comprising:

a drive mechanism for moving the cover between the retracted position and the deployed position;

a latch mechanism arranged to couple the cover to the drive mechanism; and a guide arranged to guide the latch mechanism along a predefined path as the cover is moved between the retracted position and the deployed position, wherein the guide is configured such that the latch mechanism is displaced between an open configuration and a closed configuration as the latch mechanism travels along said predefined path.

3. A device as claimed in claim 2, wherein the latch mechanism is configured to receive said cover when in said open configuration and to retain said cover when in said closed configuration.

4. A device as claimed in claim 2, wherein the latch mechanism undergoes rotation as it is displaced between said open and closed configurations.

5. A device as claimed in claim 2, wherein the latch mechanism is in said open configuration when it is positioned on a rear part of the guide, and the latch mechanism is in said closed configuration when it is positioned on a front part of the guide.

6. A device as claimed in claim 1, further comprising:

a drive mechanism for moving the cover between the retracted position and the deployed position; and a latch mechanism arranged to couple the cover to the drive mechanism, wherein the cover is configured to be mountable to a closure element of a vehicle and arranged such that the cover is coupled or received in the latch mechanism when the closure element is closed.

7. A device as claimed in claim 6, further comprising at least one elongate guide member arranged to guide the latch mechanism along a predefined path as the cover is moved between the retracted position and the deployed position, wherein a rear part of the at least one elongate guide member is disposed at or proximal to said closure element of the vehicle for receiving the cover.

8. A device as claimed in claim 1, further comprising:

a drive mechanism for moving the cover between the retracted position and the deployed position;

a latch mechanism arranged to couple the cover to the drive mechanism; and a guide arranged to guide the latch mechanism along a predefined path as the cover is moved between the retracted position and the deployed position, wherein the latch mechanism comprises at least one latch truck movable longitudinally along said guide.

9. A device as claimed in claim 8, wherein the guide is configured such that the latch truck is displaced between an open configuration and a closed configuration as the latch truck travels along said predefined path; wherein the at least one latch truck comprises a hook for engaging the cover, the hook having an opening which is exposed when the latch truck is in said open configuration and which is at least partially obstructed when the latch truck is in said closed configuration.

10. A device as claimed in claim 9, wherein a pull bar is provided at the leading edge of the cover, a pull bar having ends which are configured to be releasably fixed to a pull bar hook.

11. A device as claimed in claim 1, wherein the cover sensor is disposed on a leading edge of the cover.

12. A device as claimed in claim 1, wherein the cover sensor is disposed in a detection strip extending at least partially along the leading edge of the cover.

13. A device as claimed in claim 1, wherein the cover sensor is chosen from the group comprising mechanical switches, electrical contacts, capacitive sensors, optical sensors and sonic sensors.

14. A device as claimed in claim 1, wherein a pull bar is provided at a leading edge of the cover and wherein said cover sensor is disposed in said pull bar.

15. A device as claimed in claim 1, wherein the sensor is operable to output a signal indicative of at least one of: a seat of the vehicle being disposed within the path of the cover; the seat being in a folded/stowed state; a row position of the seat within the vehicle; a position of the seat within the vehicle with respect to a longitudinal axis of the vehicle; and, a position of a headrest of the seat with respect to a backrest of the seat.

16. A vehicle having a load space and a closure element, the vehicle comprising a device as claimed in claim 1, wherein the device is mounted to the closure element.

17. A vehicle as claimed in claim 16, the vehicle comprising:

a control unit for controlling the operation of the drive mechanism; and a drive mechanism for moving the cover between the retracted position and the deployed position;

wherein the control unit is configured to control the drive mechanism to control movement of the cover in dependence on the cover sensor.

18. A vehicle as claimed in claim 17, wherein the control unit is arranged to determine a position to which the cover can be deployed in dependence on the cover sensor prior to deploying the cover.

\* \* \* \* \*